(12) United States Patent
Mosley

(10) Patent No.: US 6,398,470 B1
(45) Date of Patent: Jun. 4, 2002

(54) STRAP WINDING TOOL

(75) Inventor: Roger G. Mosley, Metairie, LA (US)

(73) Assignee: Strap Buddy Tool Manufacturing, L.L.C., Houma, LA (US)

( * ) Notice: Subject to any disclaimer, the term of this patent is extended or adjusted under 35 U.S.C. 154(b) by 0 days.

(21) Appl. No.: 09/122,455

(22) Filed: Jul. 24, 1998

Related U.S. Application Data

(60) Provisional application No. 60/053,732, filed on Jul. 25, 1997.

(51) Int. Cl.7 .................................................. B60P 7/08
(52) U.S. Cl. ........................ 410/100; 410/96; 410/103; 410/156; 74/544; 81/73
(58) Field of Search .............................. 410/12, 96, 97, 410/100, 103, 156; 254/DIG. 3; 16/114.1; 7/168; 74/544, 545, 548; 81/35, 73, 177.2, 177.7, 489

(56) References Cited

U.S. PATENT DOCUMENTS

| | | | |
|---|---|---|---|
| 4,297,916 A | * 11/1981 | Burroughs | .................. 74/544 |
| 4,390,141 A | 6/1983 | Webster | |
| 4,510,651 A | * 4/1985 | Prete, Jr. et al. | .......... 16/114 R |
| 4,510,652 A | * 4/1985 | Van Ipersen | ............ 410/103 X |
| 4,693,432 A | 9/1987 | Tourret | |
| 4,913,608 A | 4/1990 | Royball | ...................... 410/103 |
| 5,295,664 A | 3/1994 | Kämper | |
| 5,425,154 A | * 6/1995 | Edwards, Jr. | ............. 16/114 R |
| 5,426,826 A | 6/1995 | Takimoto | |
| 5,429,463 A | * 7/1995 | Howell | ........................ 410/156 |
| 5,433,565 A | * 7/1995 | Chan | .......................... 410/103 |
| 5,494,387 A | * 2/1996 | Ruegg | ........................ 410/103 |
| 5,511,452 A | * 4/1996 | Edmonds | ........................ 81/73 |
| 5,791,844 A | * 8/1998 | Anderson | ................... 410/103 |
| 6,056,488 A | * 5/2000 | Depoy | ........................ 410/100 |
| 6,102,637 A | * 8/2000 | Mocci | ........................ 410/103 |
| 6,139,233 A | * 10/2000 | Wilsey | ....................... 410/100 |

* cited by examiner

*Primary Examiner*—Stephen T. Gordon
(74) *Attorney, Agent, or Firm*—Garvey, Smith, Nehrbass & Doody, L.L.C.

(57) ABSTRACT

A strap winding tool includes a bent metal bar with a short elbow which can fit into a borehole opening in a ratchet extension on a strap winder on a flat bed trailer.

10 Claims, 2 Drawing Sheets

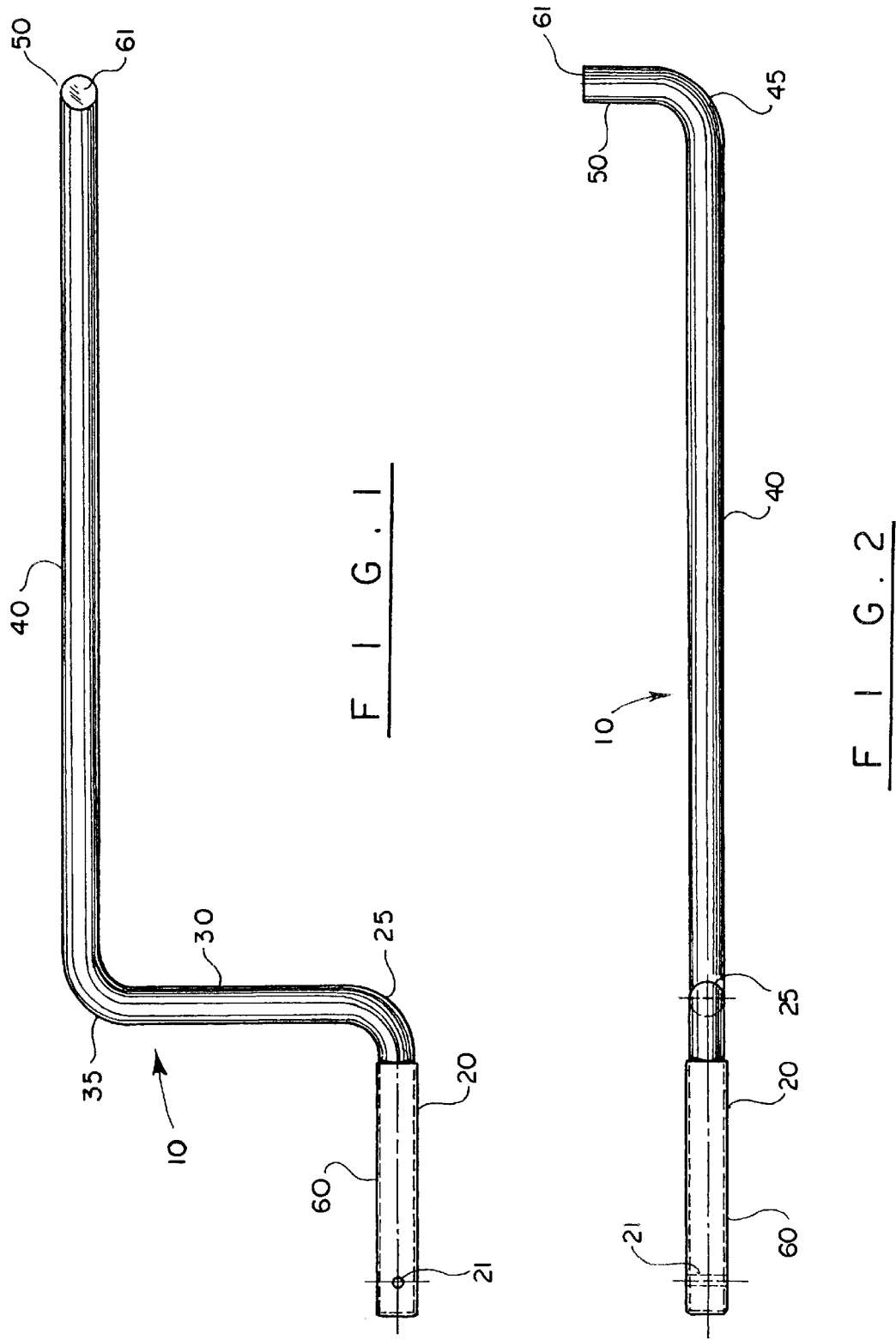

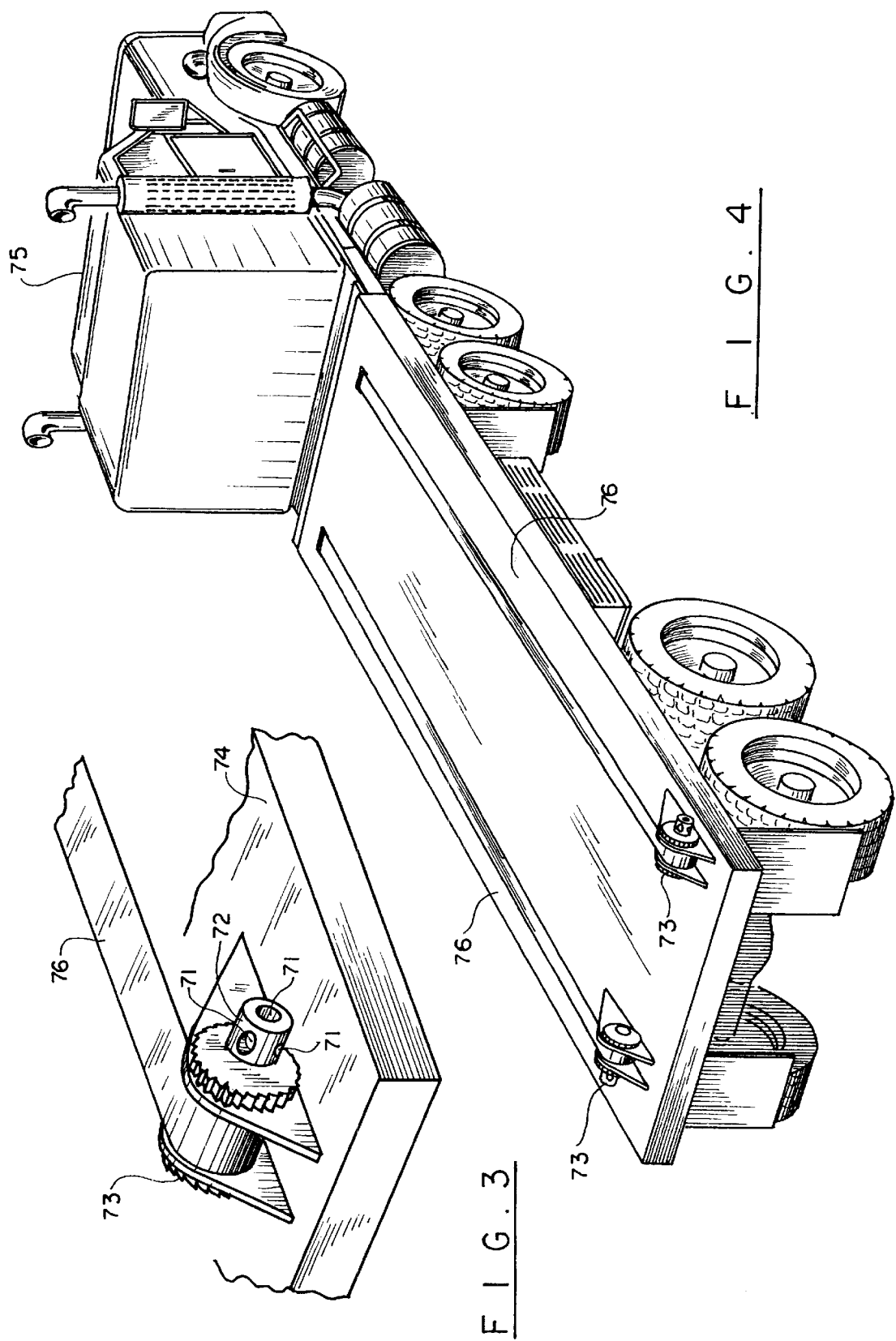

STRAP WINDING TOOL

CROSS-REFERENCE TO RELATED APPLICATIONS

Priority of U.S. Provisional Patent Application Ser. No. 60/053,732, filed Jul. 25 1997, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to straps for flat bed trailers of 18 wheelers. More particularly, the present invention relates to a tool for assisting in winding of such straps.

2. General Background of the Invention

Straps for flat bed trailers of 18 wheelers are usually wound up by hand when they are not needed. This takes a fair amount of time. Also, the ratchets on which the straps are wound get hot in the summer and cold in the winter, and are thus often uncomfortable to handle. Further, sometimes the straps can freeze, which makes it really difficult to wind the ratchet by hand.

The following U.S. Patents are incorporated herein by reference:

U.S. Pat. Nos. 4,390,141; 4,693,432; 4,913,608; 5,295,664; 5,426,826.

BRIEF SUMMARY OF THE INVENTION

The apparatus of the present invention solves the problems confronted in the art in a simple and straightforward manner. What is provided is apparatus including a strap winding tool which includes a bent metal bar with a short elbow which can fit into a bore hole opening in a ratchet extension on a strap winder on a flat bed truck.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 1 is a plan view of the preferred embodiment of the apparatus of the present invention;

FIG. 2 is a side view of the preferred embodiment of the apparatus of the present invention.

FIG. 3 is a close-up of a trailer showing a strap winding ratchet; and

FIG. 4 is a perspective view of a tractor and trailer, the trailer having strap winding ratchets thereon.

DETAILED DESCRIPTION OF THE INVENTION

U.S. Pat. No. 4,913,608 discloses a strap tightening device for straps for flat bed trailers of 18 wheelers. This is an example of a strap tightening device with which the present invention could be used.

The present invention was developed for the purpose of winding up 4" or 2" straps on a flat bed trailer. The primary reason for development of the present invention was to cut the time spent winding up straps after unloading by up to 80%. The present invention can also help to prevent muscle strain in arms and back. It can also help to prevent hand injuries that could occur when rolling straps manually. The tool of the present invention can help to give leverage when the strap may be difficult to wind, for example when the strap may be frozen or covered with ice or snow.

FIGS. 1 and 2 show the strap winding tool 10 of the preferred embodiment of the present invention. Tool 10 could be made of any suitably strong material, such as steel. It can advantageously be painted silver, for example. Preferably, however, it is made of cold-rolled steel to eliminate the painting step.

Tool 10 includes a first handle 20 (preferably covered with a red plastic cover 60). Both the handle 20 and the red plastic cover 60 preferably include a hole 21 to allow a string or other strap means to pass therethrough. The strap means could be, for example, made of leather or it could preferably be of shoe string material for work boots. A second red plastic cover 61 can cover projection 50. This second cover 61 is preferably removed when the tool 10 is used. The covers 60 and 61 need not be red and could be made of material other than plastic.

A bend 25 connects handle 20 to spacer 30, which is connected to a second handle 40 with a second bend 35. A third bend 45 connects the second handle 40 and the projection 50.

The tool 10 of the present invention is used by inserting the projection 50 into a borehole opening 71 in a ratchet extension 72 of a strap winding ratchet 73 on a flat bed trailer 74 pulled by a tractor 75. One hand of the operator is placed on the first handle 20 and the other hand of the operator is placed on the second handle 40. The tool 10 is then rotated about the longitudinal axis of handle 40 until the strap 76 is completely wound about the ratchet 73.

The tool 10 of the present invention could be used to wind up any straps which are connected to an appropriated sized and shaped ratchet.

The first handle 20 can have a length of, for example, 2" to 10", preferably 3" to 8½", more preferably 3½" to 6½", and most preferably 4½". The hole 21 has a diameter of, for example, 1/16" to ¼", and preferably 3/16". The spacer 30 can have a length of, for example, 2" to 10", preferably 3" to 8½", more preferably 3½" to 6½", and most preferably 4½". The second handle 40 can have a length of, for example, 3" to 36", preferably 8" to 24", more preferably 10" to 18", and most preferably 13".

The bends 25, 35, and 45 could be 30 degrees to 150 degrees, but are preferably 50 degrees to 130 degrees, more preferably 75 degrees to 105 degrees, and most preferably 90 degrees.

Exemplary dimensions for the diameter of the tool 10 are 3/16" to 1", preferably ¼" to ¾", more preferably 5/16" to ⅝", and most preferably ½ inch.

The projection 50 can have a length of, for example, 1" to 3", preferably 1½ to 2½", more preferably 1⅝" to 2", and most preferably 1¾".

PARTS LIST:

The following is a list of parts and materials suitable for use in the present invention:

10 strap winding tool of the preferred embodiment of the present invention (any suitably strong steel, for example, preferably painted silver, for example)

20 handle
21 hole in handle 20 and cover 60
25 bend connecting handle 20 to spacer 30
30 spacer
35 bend connecting spacer 30 and handle 40
40 handle
45 bend connecting handle 40 and projection 50
50 projection
60 handle cover (red plastic, for example)
61 tip cover (red plastic, for example)

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

What is claimed is:

1. A system for winding straps of a trailer, comprising:
   a) a plurality of ratcheted spools mounted on the trailer, each spool having a borehole opening in a ratchet extension;
   b) a plurality of straps secured to the trailer, the straps being wound upon said plurality of ratcheted spools;
   c) a tool body that includes a first handle section and a second handle section and an axis of rotation;
   d) means for axially separating the first handle section and the second handle section;
   e) the tool body including a projection section transverse to the axis of rotation configured for inserting into the borehole opening in the ratchet extension of the ratcheted spool.

2. The apparatus of claim 1, wherein:
   the first handle section has a length of 3" to 8½";
   the second handle section has a length of 8" to 24";
   the means for axially separating the first handle section and the second handle section comprises a spacer section of the tool body having a length of 3" to 8½";
   the projection section of the tool body having a length of 1½" to 2½".

3. The apparatus of claim 1, wherein:
   the first handle section has a length of 3½" to 6½";
   the second handle section has a length of 10" to 18";
   the means for axially separating the first handle section and the second handle section comprises a spacer having a length of 3½" to 6½";
   the projection section having a length of 1⅝"to 2".

4. The apparatus of claim 1, further comprising the trailer.

5. The apparatus of claim 4, further comprising a tractor to pull the trailer.

6. The apparatus of claim 1, wherein:
   the first handle section has a length of 2" to 10";
   the second handle section has a length of 3" to 36";
   the means for axially separating the first handle section and the second handle section comprises a spacer section of the tool body having a length of 2" to 10"; the projection section of the tool body having a length of 1" to 3".

7. A flat bed trailer apparatus, comprising:
   a) a trailer chassis having opposed sides;
   b) a plurality of ratcheted spools mounted in spaced apart locations along a side portion of the trailer chassis, each spool having a borehole opening;
   c) a tool body that removably engages a selected one of the ratcheted spools, said tool body having an axis of rotation and including:
      i) a first handle section;
      ii) a second handle section,
      iii) a spacer section axially separating the first handle section and the second handle section;
      iv) a plurality of bends connecting the spacer section to the first handle section and the second handle section; and
      v) a projection section that extends transversely relative to the axis of rotation for inserting into a selected one of the borehole openings, the projection section being connected to the second handle section with a bend.

8. The apparatus of claim 7, wherein:
   the bends connecting the spacer section to the first handle section and the second handle section and the bend connecting the projection section to the second handle section have an angle of 30 degrees to 150 degrees.

9. The apparatus of claim 7, wherein:
   the bends connecting the spacer section to the first handle section and the second handle section and the bend connecting the projection section to the second handle section have an angle of 50 degrees to 130 degrees.

10. The apparatus of claim 7, wherein:
    the bends connecting the spacer section to the first handle section and the second handle section and the bend connecting the projection section to the second handle section have an angle of 75 degrees to 105 degrees.

* * * * *